(12) United States Patent
Fujisawa et al.

(10) Patent No.: US 7,976,986 B2
(45) Date of Patent: Jul. 12, 2011

(54) SINTERED SUBSTRATE AND ALKALINE STORAGE BATTERY USING THE SUBSTRATE

(75) Inventors: Chihiro Fujisawa, Osaka (JP); Atsuya Furuichi, Osaka (JP); Kazuki Shimozono, Osaka (JP); Kohei Karasumi, Osaka (JP); Yasushiro Kudo, Osaka (JP); Makoto Ochi, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 635 days.

(21) Appl. No.: 12/057,825

(22) Filed: Mar. 28, 2008

(65) Prior Publication Data

US 2008/0241691 A1  Oct. 2, 2008

(30) Foreign Application Priority Data

Mar. 31, 2007  (JP) ................................ 2007-095866

(51) Int. Cl.
*H01M 4/80* (2006.01)
*B22F 3/11* (2006.01)
*B22F 7/04* (2006.01)

(52) U.S. Cl. ................... 429/237; 29/2; 419/2; 428/557

(58) Field of Classification Search .................. 429/235, 429/237; 427/123; 419/2; 29/2; 428/557
See application file for complete search history.

(56) References Cited

U.S. PATENT DOCUMENTS

| 3,405,011 A | * | 10/1968 | Caprioglio | .................... 419/2 X |
| 4,206,271 A | * | 6/1980 | Norling et al. | ............ 429/235 X |
| 6,103,319 A | * | 8/2000 | Harada et al. | ............. 427/123 X |
| 2003/0118466 A1 | * | 6/2003 | Yuh et al. | .......................... 419/2 |

FOREIGN PATENT DOCUMENTS

| JP | 4-248269 A | 9/1992 |
| JP | 2003-297371 A | 10/2003 |

\* cited by examiner

*Primary Examiner* — Stephen J. Kalafut

(74) *Attorney, Agent, or Firm* — Westerman, Hattori, Daniels & Adrian, LLP

(57) ABSTRACT

A sintered substrate is configured such that pores having a pore size (pore radius) of from 5 μm to 7 μm have a peak volume fraction with respect to the total pore volume of the sintered substrate, and pores having a pore radius of greater than 8.5 μm has a volume fraction of 11% or less with respect to the total pore volume of the sintered substrate. The sintered substrate has a smaller number of large-sized pores than conventional sintered substrates and a more uniform pore size distribution, and therefore shows a sufficient strength even when the porosity is increased. In addition, a cadmium negative electrode employing the sintered substrate shows excellent gas absorption capability and therefore can reduce the internal pressure of the battery during charge.

3 Claims, No Drawings

SINTERED SUBSTRATE AND ALKALINE STORAGE BATTERY USING THE SUBSTRATE

BACKGROUND OF THE INVENTION

1. Field of the Invention

The present invention relates to sintered substrates used for alkaline storage batteries and to alkaline storage batteries using the substrates.

2. Description of Related Art

Alkaline storage batteries have been used as power sources for apparatus that require high power, such as power tools and hybrid electric automobiles in recent years.

Typical examples of electrode plates for the alkaline storage batteries are sintered electrode plates, which are obtained by filling an active material into pores in a porous sintered substrate in which nickel powder is sintered on both sides of a perforated steel plate or the like, and non-sintered electrode plates, which are obtained by applying a paste prepared by mixing an active material powder with a binder agent onto a conductive substrate such as a perforated steel plate and a nickel foam. The sintered electrode plates are excellent in conductivity because of the sintered nickel and are therefore more advantageous for batteries that require high power as mentioned above.

The sintered electrode plates are generally manufactured in the following manner.

First, a slurry is prepared by kneading nickel powder, a thickening agent such as methyl cellulose, and water in predetermined proportions. Then, the resultant slurry is coated onto the surface of a conductive core such as a perforated steel plate, and a sintering process is performed by heating the material in a reducing atmosphere. A sintered substrate is thus obtained.

By filling an active material into the resultant sintered substrate, a sintered electrode plate is obtained. In the case of a sintered cadmium negative electrode, for example, the sintered substrate is immersed in a solution containing cadmium nitrate as its main component so that cadmium nitrate can be held in the pores, and then the sintered substrate is immersed in an alkaline solution, such as sodium hydroxide, to thereby convert the cadmium nitrate in the pores into cadmium hydroxide. This process is repeated a necessary number of times to fill a predetermined amount of cadmium hydroxide into the pores of the sintered substrate. Thus, the sintered cadmium negative electrode is obtained.

When the pores occupy a greater proportion (i.e., the porosity is greater) in a sintered substrate, a greater amount of active material can be filled in the sintered substrate correspondingly and the energy density of the electrode plate can be increased. For this reason, a pore forming agent made of microcapsules using an organic shell is added to the above-described slurry in order to increase the porosity of the sintered substrate.

On the other hand, increasing the porosity can lead to a poorer strength of the sintered substance. When the strength lowers, peeling may occur in the subsequent electrode coiling process step or the like, which can become a cause of short circuiting after the battery is assembled. Thus, there is a demand for a sintered substrate that has an improved porosity and also maintains a certain degree of strength.

A reason for the lower strength that results from increasing the porosity by the addition of a pore forming agent is believed to be that formation of large-sized pores originating form the pore forming agent occurs. Such large-sized pores do not proportionately increase the amount of the active material that can be filled in the substrate relative to the increase of the porosity since the active material is not easily held in such large-sized pores. Moreover, such large-sized pores may result in a poorer conductivity of the sintered substrate and consequently deteriorates the utilization factor.

In view of these problems, Japanese Published Unexamined Patent Application Nos. H4-248269 and 2003-297371, for example, propose methods of reducing the large-sized pores in the sintered substrate to make the pore size distribution uniform. By reducing the number of the large-sized pores, an improvement in the porosity and maintaining of the strength can be accomplished at the same time.

However, as further higher performance electrodes have been demanded, it has become necessary to develop a sintered substrate in which the number of the large-sized pores is less and the pore size distribution is more uniform.

The present invention has been accomplished in view of the foregoing circumstances, and it is an object of the invention to provide a sintered substrate having a more uniform pore size distribution than the conventional ones, and to provide an alkaline storage battery using the substrate.

SUMMARY OF THE INVENTION

In order to accomplish the foregoing and other objects, the present invention provides a sintered substrate comprising a conductive core and a sintered substance formed on both sides the conductive core, wherein pores having a pore radius of from 5 µm to 7 µm have a peak volume fraction with respect to the total pore volume of the sintered substrate, and pores having a pore radius of greater than 8.5 µm have a volume fraction of 11% or less with respect to the total pore volume of the sintered substrate.

The alkaline storage battery according to the present invention has a sintered cadmium negative electrode that is manufactured using the above-described sintered substrate.

The method of manufacturing a sintered substrate according to the present invention is characterized in that the sintered substrate is manufactured by using a nickel powder having a bulk density of 0.57 g/cm$^3$ and a Fisher size of 2.5 µm and using a completely-swelled hollow organic substance having an average particle size of 25 µm and a coefficient of variation of particle size distribution of 30% or less.

In the sintered substrate of the present invention, while the pores having a pore radius of from 5 µm to 7 µm have a peak volume fraction with respect to the total pore volume of the sintered substrate, the pores having a pore radius of greater than 8.5 µm have a volume fraction of 11% less. This means that the number of large-sized pores is small, and the pore size distribution is uniform. As a result, the substrate strength can be maintained even when the porosity is increased. Moreover, when the sintered substrate according to the present invention is used for a cadmium negative electrode, oxygen gas absorption is promoted during charge of the battery, and the internal pressure of the battery can be reduced.

The sintered substrate according to the present invention can be manufactured as follows. A nickel slurry is prepared using a nickel powder having a bulk density of 0.57 g/cm$^3$ and a Fisher size of 2.5 µm and a completely-swelled hollow organic substance having an average particle size of 25 µm and a coefficient of variation of particle size distribution of 30% or less. The just-described slurry is applied onto a perforated steel plate and is sintered at a high temperature.

Large-sized pores tend to form easily when the particle size of the pore forming agent is relatively large, but they can also form even when the particle size of the pore forming agent is small. We have made a study on the causes of this, and as a result, we have found that this is due to the fact that part of the pore forming agent used is aggregated. More specifically, it is believed that since the pore forming agent remains aggregated in the slurry when sintered, large-sized pores form even when the particle size of the pore forming agent is small. By using a pore forming agent that causes less aggregation of the particles with one another, in other words, by using a pore forming agent in which the particles have a higher dispersibility, it becomes possible to prevent formation of the large-sized pores due to the aggregation of the pore forming agent particles, and to prepare a sintered substrate in which the pore distribution is more uniform.

Specifically, a pore forming agent having a coefficient of variation of particle size distribution of 30% or less should be used. When determining the particle size distribution of a pore forming agent, there are cases in which not only the particle sizes of the particles themselves but also the sizes of the secondary particles, in which a plurality of particles are aggregated, are observed and consequently the particle size distribution becomes non-uniform. A coefficient of variation of particle size distribution of 30% or less means a state in which almost no such secondary particles are formed and the particle size distribution is uniform. In other words, it indicates a state in which the dispersibility is high.

DETAILED DESCRIPTION OF THE INVENTION

Hereinbelow, preferred embodiments of the present invention will be described.

(1) Sintered Substrate

A sintered substrate of the present invention is manufactured in the following manner.

First, a slurry is prepared by kneading a nickel powder, an aqueous solution of an organic polymer such as methyl cellulose as a binder, and a completely-swelled hollow organic substance as a pore forming agent in appropriate amounts. The resultant slurry is applied onto both sides of a conductive core, such as a nickel plated perforated steel plate.

The resultant nickel plated perforated steel plate on which the above-described slurry has been applied is heated to dry the slurry. Thereafter, the slurry is sintered at 1000° C., for example, in a reducing atmosphere. Thus, a sintered substrate is obtained.

The pore size and pore size distribution of the sintered substrate are adjusted by the physical properties of the nickel powder and the pore forming agent used. The sintered substrate of the present invention can be manufactured by using a nickel powder having a bulk density of 0.57 g/cm$^3$ and a Fisher size of 2.5 µm and using, as the pore forming agent, a completely-swelled hollow organic substance having an average particle size of 25 µm and a coefficient of variation of particle size distribution of 30% or less.

In the sintered substrate thus prepared, pores having a pore size (pore radius) of from 5 µm to 7 µm have a peak volume fraction with respect to the total pore volume of the sintered substrate, and the cumulative total of the volume fraction of pores having a pore radius of greater than 8.5 µm is 11% or less.

(2) Cadmium Negative Electrode

The sintered substrate prepared in the foregoing manner is immersed in an aqueous solution (impregnant solution) comprising cadmium nitrate. By the just-described immersion, cadmium nitrate is held in the pores in the sintered substrate. The resultant sintered substrate is then immersed in an aqueous solution of sodium hydroxide (NaOH) to convert the cadmium nitrate into cadmium hydroxide. After this, the aqueous solution of sodium hydroxide is removed from the sintered substrate by washing it with water, and a drying process is carried out as appropriate. The filling process for the sintered substrate, which comprises the immersion in the impregnant solution, the immersion in the aqueous solution of sodium hydroxide, and the water washing and drying step, is repeated a plurality of times to fill a predetermined amount of active material into the sintered substrate. It should be noted that additives such as nickel salts may be added to the impregnant solution as appropriate in order to improve the utility of the active material, for example.

Next, a formation treatment is carried out to remove impurities from the sintered substrate in which the active material has been filled. The formation treatment may be performed by charging and discharging the sintered substrate in which the active material has been filled in an alkaline aqueous solution of sodium hydroxide, potassium hydroxide, or the like. Alternatively, the sintered substrate in which the active material has been filled may be heated to decompose and remove the impurities.

Then, the sintered substrate subjected to the just-described formation treatment is precharged in an alkaline aqueous solution, and is thereafter water washed and dried. Thus, a cadmium negative electrode plate of the present invention is manufactured.

(3) Alkaline Storage Battery

The cadmium negative electrode prepared in the above-described manner and a nickel positive electrode were coiled with a separator interposed therebetween to prepare an electrode assembly, and the coiled electrode assembly is placed into a battery can. An electrolyte solution composed of an alkaline aqueous solution is filled into the battery can, and the opening of the battery can is sealed by a lid. Thus, an alkaline storage battery of the present invention is manufactured.

EXAMPLE (1) Sintered Substrate

A nickel plated perforated steel plate in which 4 µm-thick nickel was plated on the surface of a 60 µm-thick perforated steel plate was prepared as a conductive core.

Next, 40 parts by mass of nickel powder (made by Inco Ltd., bulk density: 0.57 g/cm$^3$, Fisher size: 2.5 µm), 0.05 parts by mass of completely-swelled hollow organic substance (made by Matsumoto Yushi-Seiyaku Co., Ltd.) containing methyl methacrylate-acrylonitrile copolymer as its main component, serving as the pore forming agent, and 60 parts by mass of a 3 wt % aqueous methyl cellulose solution were kneaded to prepare a slurry.

Then, the resultant nickel plated perforated steel plate on which the above-described slurry was applied was heated at 800° C. for 30 seconds to dry the slurry. Thereafter, the slurry was sintered at 1000° C. in a reducing atmosphere. Thus, a sintered substrate according to Example was obtained.

The particle size distribution of the pore forming agent was measured in the state in which the pore forming agent was dispersed in pure water, using a laser diffraction scattering method (Microtrac MT3300EX made by Nikkiso Co., Ltd.). It was found that the average particle size was 25 µm and the coefficient of variation of particle size distribution was 29%.

(2) Cadmium Negative Electrode Plate

The sintered substrate according to Example was immersed in a mixed aqueous solution (impregnant solution) comprising cadmium nitrate to which nickel nitrate was added. Next, the sintered substrate was heated to dry out the aqueous solution held in the substrate. By these immersion process and drying process, a cadmium salt (nitrate salt) was held in the pores in the sintered substrate. The resultant sintered substrate was then immersed in an aqueous solution of 25 mass % sodium hydroxide (NaOH) to convert the salt comprising cadmium into a hydroxide. After this, the aqueous solution of sodium hydroxide was removed from the sintered substrate by washing it with water sufficiently, followed by a drying process, so that an active material comprising cadmium hydroxide was held within the pores of the porous nickel sintered substrate. The filling process for the sintered substrate, which comprises the immersion in the impregnant solution, the immersion in the aqueous solution of sodium hydroxide, and the water washing and drying step, was repeated 6 times to fill a predetermined amount of the active material into the sintered substrate.

Next, the sintered substrate filled with the active material was subjected to a formation treatment for removing impurities by heating it at about 200° C. The substrate was then pre-charged in an alkaline aqueous solution, and thereafter water washed and dried. Thus, a cadmium negative electrode according to Example was obtained.

(3) Alkaline Storage Battery

The cadmium negative electrode according to Example and a sintered nickel positive electrode were coiled with a separator interposed therebetween to prepare an electrode assembly, and the coiled electrode assembly was placed into a battery can. An electrolyte solution composed of an alkaline aqueous solution was filled into the battery can, and the opening of the battery can was sealed by a lid. Thus, an alkaline storage battery according to Example (SC size, nominal capacity: 2.4 Ah) was manufactured.

COMPARATIVE EXAMPLE

A sintered substrate according to Comparative Example was prepared in the following manner.

A sintered substrate according to Comparative Example was prepared in the same manner as described in Example above, except that the slurry was prepared using a completely-swelled hollow organic substance (made by Matsumoto Yushi-Seiyaku Co., Ltd.) having an average particle size of 55 μm and a coefficient of variation of particle size distribution of 39%, and that the completely-swelled hollow organic substance was added in the slurry in an amount of 0.5 parts by mass.

Then, a cadmium negative electrode and an alkaline storage battery according to Comparative Example were prepared in the same manufacturing process as described in the foregoing Example.

Experiment 1

Evaluation of Properties of Sintered Substrate

The pore size distributions of the pores in the sintered substrates according to Example and Comparative Example were determined using a mercury porosimeter (PASCAL 140 made by Fisons Instruments Inc.). In addition, the sintered substrates were immersed in pure water, and the porosities were calculated from the masses of the water impregnated in the sintered substrates. Further, the tensile strengths along a thickness direction of the sintered substrates were determined using a tensile strength tester (Adherence Tester Model No. Sebastian V, made by Quad Group Inc.).

TABLE 1

| Measurement item | | Example | Comparative Example |
|---|---|---|---|
| | Pore size (μm) | Volume fraction (%) | |
| Pore size distribution | less than 3.6 | 0.3 | 0.9 |
| | 3.6-3.8 | 2.4 | 1.8 |
| | 3.8-4.2 | 7.2 | 6.8 |
| | 4.2-4.7 | 8.6 | 8.6 |
| | 4.7-5.3 | 11.5 | 11.7 |
| | 5.3-6.0 | 18.2 | 16.2 |
| | 6.0-6.7 | 23.6 | 20.3 |
| | 6.7-7.6 | 13.4 | 13.5 |
| | 7.6-8.5 | 5.0 | 6.3 |
| | 8.5-9.5 | 2.4 | 2.7 |
| | 9.5-10.8 | 1.0 | 1.8 |
| | 10.8-15.4 | 1.9 | 4.1 |
| | 15.4-21.5 | 1.4 | 1.4 |
| | 21.5-34.8 | 1.4 | 1.8 |
| | greater than 34.8 | 2.4 | 2.3 |
| Porosity (%) | | 86.0 | 86.0 |
| Strength (N/cm$^2$) | | 240 | 170 |

The results shown in Table 1 demonstrate the following. In both Example and Comparative Example, the volume fraction reaches the peak in the pore size (pore radius) range of from 6.0 μm to 6.7 μm. However, when the cumulative totals of the volume fractions in the pore size ranges greater than 8.5 μm are compared, the cumulative total of the volume fractions for the sintered substrate according to Comparative Example is 14.0%, while that for the sintered substrate according to Example is 10.2%. Thus, it was confirmed that the volume fraction of the pores with large pore sizes was relatively small in the sintered substrate according to Example. It is understood that, in particular, the sintered substrate according to Example showed a smaller volume fraction in the pore size range of from 9.5 μm to 15.4 μm than that of Comparative Example. In other words, the sintered substrate according to Example has a smaller number of the pores with large pore sizes and a more uniform pore size distribution than the sintered substrate according to Comparative Example. Therefore, the sintered substrate according to Example exhibited a significant improvement in strength over Comparative Example, even with the same porosity as that of Comparative Example.

Experiment 2

Evaluation of Battery Performance

The internal pressures during charge were measured for the alkaline storage batteries according to Example and Comparative Example. The internal pressures were measured as follows. A hole having a diameter of about 2 mm was formed in a bottom portion of the battery can of each of the alkaline storage batteries of Example and Comparative Example, and then each battery was attached to a pressure measurement device equipped with a piezoelectric element. The charging was carried out at 2.4 A (a current corresponding to 1 It) for 1.5 hours. The results are shown in Table 2 below.

TABLE 2

| | Example | Comparative Example |
|---|---|---|
| Internal pressure (MPa) | 0.46 | 0.69 |

As the results in Table 2 show, the alkaline storage battery of the example had a lower internal pressure than the alkaline storage battery of the comparative example. This is believed to be because the conductivity of the sintered substrate in the example was improved since the number of the large-sized pores in the sintered substrate was reduced.

Although preferred embodiments of the sintered substrate and the alkaline storage battery using the substrate according to the present invention have been described thus far, it should be understood that the present invention is not limited to the foregoing preferred embodiments.

For example, the battery according to the present invention is not limited to the batteries in which the electrode plate is coiled, but may be alkaline storage batteries that employ an electrode assembly in which a plurality of electrode plates are layered.

In addition, the sintered substrate of the present invention may be applied to a nickel positive electrode although the foregoing example shows an example in which the sintered substrate of the present invention is applied to a cadmium negative electrode.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and is not intended to limit the invention as defined by the appended claims and their equivalents.

What is claimed is:

1. A sintered substrate comprising a sintered substance on both sides of a conductive core, where the sintered substance has a peak volume fraction of pores having a pore radius from 5 μm to 7 μm, and where 11% or less of the total pore volume has a pore size of greater than 8.5 microns.

2. An alkaline storage battery comprising a sintered cadmium negative electrode having a sintered substrate impregnated with an active material comprising a cadmium compound, wherein the sintered substrate is a sintered substrate according to claim 1.

3. A method of manufacturing a sintered substrate, comprising:
    applying a slurry comprising nickel powder, a binder, and a pore forming agent onto a surface of a conductive core, and heating the conductive core on which the slurry has been applied, to sinter the nickel slurry;
    using, as the nickel powder, as a nickel powder having a bulk density of 0.57 g/cm$^3$ and a Fisher size of 2.5 μm; and
    using, as the pore forming agent, a completely-swelled hollow organic substance having an average particle size of 25 μm and a coefficient of variation of particle size distribution of 30% or less,
    wherein the sintered substrate comprises a sintered substance on both sides of a conductive core, where the sintered substance has a peak volume fraction of pores having a pore radius from 5 to 7 microns and where 11% or less of the total pore volume has a pore size of greater than 8.5 microns.

* * * * *